US010033826B2

(12) United States Patent
Miller et al.

(10) Patent No.: US 10,033,826 B2
(45) Date of Patent: Jul. 24, 2018

(54) TOKEN BASED DYNAMIC CACHE-BUSTING

(71) Applicant: Verizon Patent and Licensing Inc., Arlington, VA (US)

(72) Inventors: Joshua M. Miller, Gunter, TX (US); Dima Kusai, Aliso Viejo, CA (US); Naveen Indurti, Irvine, CA (US); Rajeevan Kuniyil, Irvine, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 206 days.

(21) Appl. No.: 14/851,712

(22) Filed: Sep. 11, 2015

(65) Prior Publication Data

US 2017/0078432 A1 Mar. 16, 2017

(51) Int. Cl.
G06F 15/16 (2006.01)
G06F 12/00 (2006.01)
H04L 29/08 (2006.01)

(52) U.S. Cl.
CPC ...... H04L 67/2842 (2013.01); H04L 67/2804 (2013.01)

(58) Field of Classification Search
CPC ... H04L 47/10; H04L 29/06; H04L 29/06095; H04L 29/06115; H04L 47/30; H04L 29/08072; H04L 29/0809; H04L 29/08117; G06Q 30/02; G06F 12/0888; G06F 9/383; G06F 12/0802; G06F 12/0859; G06F 12/0897
USPC .......................................................... 709/235
See application file for complete search history.

(56) References Cited

U.S. PATENT DOCUMENTS

| 8,490,077 B2 * | 7/2013 | Miranda-Steiner ....... G06F 8/65 709/220 |
| 9,456,050 B1 * | 9/2016 | Lepeska .............. H04L 67/2847 |
| 2009/0288077 A1 * | 11/2009 | Miranda-Steiner ....... G06F 8/65 717/173 |
| 2010/0180082 A1 * | 7/2010 | Sebastian ................ H04L 67/02 711/126 |
| 2012/0042049 A1 * | 2/2012 | Miyazaki ............ H04L 41/0677 709/219 |
| 2014/0250366 A1 * | 9/2014 | Bertram .............. G06F 17/3089 715/234 |
| 2015/0379014 A1 * | 12/2015 | Xu ........................ G06F 17/211 707/711 |

(Continued)

OTHER PUBLICATIONS

What is a cache buster? published on Feb. 22, 2010 by Adopsinsider.*

(Continued)

*Primary Examiner* — Mahran Abu Roumi

(57) ABSTRACT

A device may receive a request for a page. The page may include a content identifier that is associated with referencing first content for the page. The content identifier may be associated with cache-busting being performed. The device may determine modification information associated with the first content based on receiving the request for the page. The device may generate a token based on the content identifier and the modification information. The device may generate a tokenized content identifier based on the token and the content identifier. The device may provide the tokenized content identifier. The tokenized content identifier may be associated with referencing the first content for the page.

20 Claims, 5 Drawing Sheets

(56) References Cited

U.S. PATENT DOCUMENTS

2016/0253361 A1* 9/2016 Nguyen ............ G06F 17/30297
 707/769

OTHER PUBLICATIONS

Statis File Cache Busting, published on Oct. 28, 2014 by Isaac Su.*
Wikipedia, "Web cache", https://en.wikipedia.org/wiki/Web_cache, Aug. 3, 2015, 4 pages.

* cited by examiner

TOKEN BASED DYNAMIC CACHE-BUSTING

BACKGROUND

A user device may cache information from a web page for utilization by a web browser. For example, the user device may store content (e.g., an image, a video, a script, or the like) included within the web page in a cache, and may obtain the content from the cache when a user refreshes the web page. Periodically, the user device may remove information from the cache to ensure that updated information is provided via the browser. For example, the user device may remove the image from the cache, and may obtain another image from a content server when the user refreshes the web page.

DETAILED DESCRIPTION OF PREFERRED EMBODIMENTS

The following detailed description of example implementations refers to the accompanying drawings. The same reference numbers in different drawings may identify the same or similar elements.

A user device may utilize a web browser to access pages (e.g., web pages). The user device may obtain content referenced in a page for inclusion when providing the page, such as an embedded image, an embedded video, an embedded script, or the like. The user device may cache content of the page (e.g., the embedded image) in a data structure to reduce a quantity of time required to load the page, a quantity of network traffic associated with obtaining the content for the page, or the like relative to obtaining the page without utilizing cached content.

Periodically, the user device may expire content in a cache (e.g., remove the content) to reduce a likelihood that content is provided in a page when the content is no longer intended for inclusion in the page. For example, an image representing a sales offer may be intended for inclusion in a page for a particular period of time, after which another image representing another sales offer is intended for inclusion.

A third-party application may perform cache-busting for program code of a page by altering a content identifier (e.g., a file name) of content embedded in the page as a post-processing procedure. Cache-busting may refer to causing content to be removed from a cache. In this way, the content server may alter the program code of the page to cause the user device to request updated content, based on failing to find the altered content identifier in a cache. For example, an image reference set as "<img src="image.jpg"/> will be published as a modified image reference "<img src="image.jpg?1234">" without the developer having tested and/or scripted program code of the page with the modified image reference.

However, allowing alteration of a file name in the program code may allow a user to inject malicious program code into the page for execution by the user device. Moreover, utilizing post-processing of the code may cause program code, which was debugged for errors before publishing, to include errors as a result of the post-processing. Implementations, described herein, may utilize token generation to facilitate dynamic cache-busting without third-party alteration of code. In this way, a developer may develop code that remains atomic but is capable of update for cache-busting.

Figure 1A:
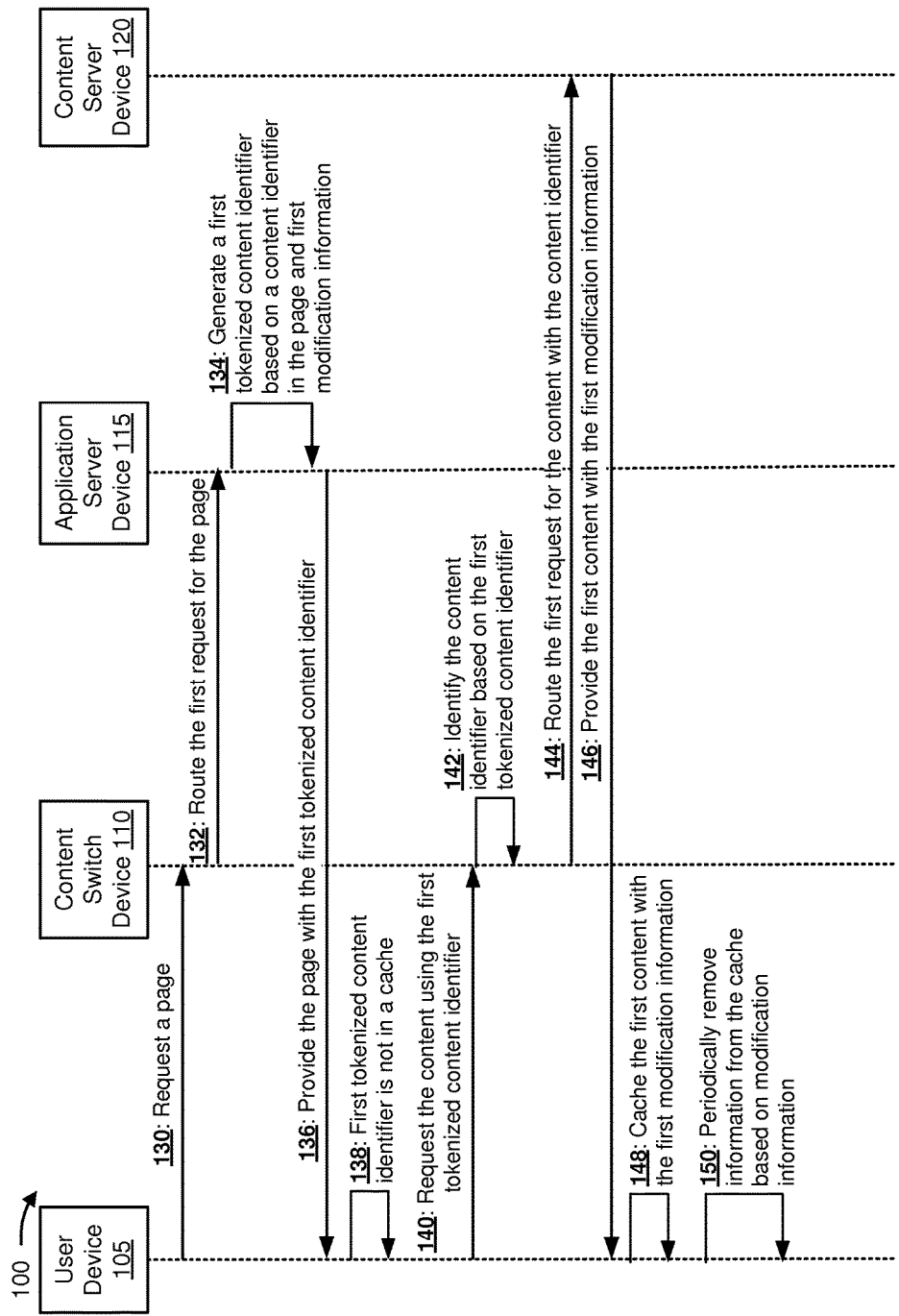
FIGS. 1A and 1B are call flow diagrams of an example implementation described herein.
Figure 1B:
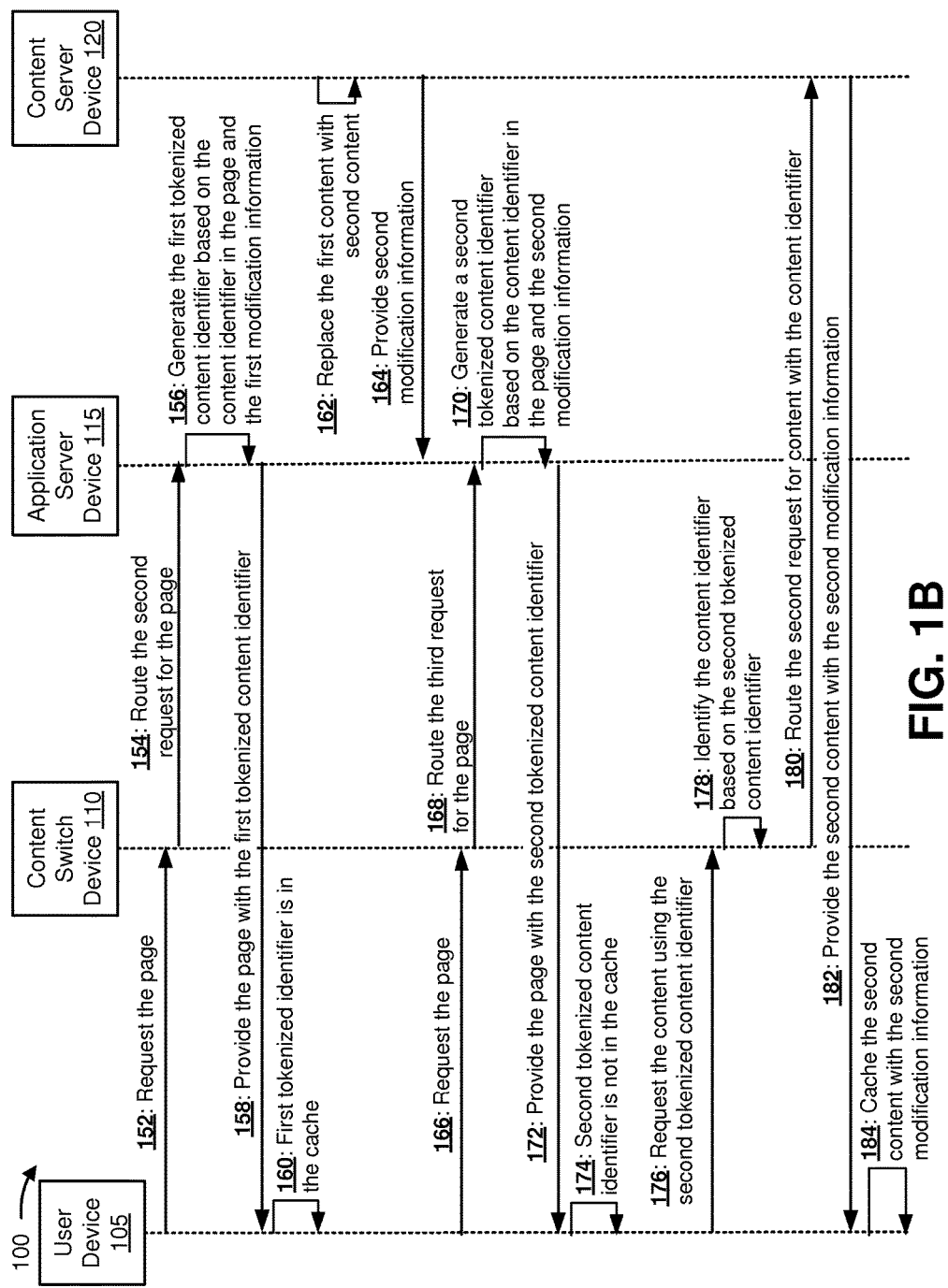

FIGS. 1A and 1B are call flow diagrams of an example process 100. FIGS. 1A and 1B show an example of generating a token to facilitate dynamic cache-busting. In some implementations, one or more operations of FIGS. 1A and 1B may be performed by a user device 105, a content switch device 110, an application server device 115, a content server device 120, or the like.

As shown in FIG. 1A, process 100 may include requesting a page (as shown by reference number 130). For example, user device 105 may transmit a first request for the page to content switch device 110. A page (e.g., a web page) may refer to a document that includes content, such as a servlet, a server side applet, or the like. For example, user device 105 may request a java server pages (JSP) format page that includes a first content identifier. The first request may include a page identifier, such as a JSP identifier (e.g., a ".jsp" identifier that references program code associated with application server device 115).

As further shown in FIG. 1A, process 100 may include routing the first request for the page (as shown by reference number 132). For example, content switch device 110 may determine that the first request for the page identifies a page associated with application server device 115, and may route the first request to application server device 115.

As further shown in FIG. 1A, process 100 may include generating a first tokenized content identifier based on a content identifier (e.g., a file name) in the page and first modification information (e.g., a last modified date associated with content referenced by the content identifier) (as shown by reference number 134). For example, application server device 115 may generate the first tokenized content identifier. In some implementations, application server device 115 may determine that the content identifier is intended for cache-busting, and may generate the first tokenized content identifier based on determining that the content identifier is intended for cache-busting. For example, application server device 115 may identify program code including a script indicating an intention for cache-busting to be performed (e.g. a script including <img src="<xyz:cachebust>xyz.com/[content identifier]</xyz:cachebust>"></script>). In this case, the developer generates code specifically intended for cache-busting by including the tags "<xyz:cachebust>" and "</xyz:cachebust>".

A content identifier may refer to a reference, included in program code of the page, to content. For example, the page may include a content identifier in the form of a file name (e.g. "animal.jpg") that references a first image (e.g., an image of a cat). A token may refer to a string generated based on the content identifier and modification information associated with the content. For example, application server device 115 may generate a first token based on the file name (e.g., "animal.jpg") and a last modified date (e.g., "2015-01-01T01:10:00") using a hashing algorithm. The last modified date may refer to information identifying when the first image was created and/or altered.

A tokenized content identifier may refer to a reference, which application server device 115 includes in the program code of the page rather than the content identifier. For example, application server device 115 may append the first token to the content identifier to generate the first tokenized content identifier. In this case, application server device 115 generates the first tokenized content identifier based on the file name (e.g., "animal.jpg"), the first token (e.g., "12345"), and an indicator that the file name is a tokenized content identifier for cache-busting (e.g. "-cb") resulting in the first tokenized content identifier taking a form of "animal-cb12345.jpg". Application server device 115 may insert the first tokenized content identifier into the program code where the script indicating the intention for cache-busting to be performed was located (e.g., resulting in <script src="xyz.com/animal=cb12345.jpg"></script>). Although a particular format for tokenized content identifiers is described herein, another format may be utilized that is similar to the format, different from the format, or the like.

As further shown in FIG. 1A, process 100 may include providing the page with the first tokenized content identifier (as shown by reference number 136). For example, application server device 115 may transmit, to user device 105, program code (e.g., HyperText Markup Language (HTML)), which includes the first tokenized content identifier, of the page. In this way, the user device 105 is not provided the content identifier, thereby preventing a direct reference to content of content server device 120, and reducing a likelihood of expired content being referenced in a cache of user device 105.

As further shown in FIG. 1A, process 100 may include determining that the first tokenized content identifier is not in a cache (as shown by reference number 138). For example, user device 105 may determine that the first tokenized content identifier is not included in the cache of user device 105 (e.g., a browser cache of a web browser of user device 105).

As further shown in FIG. 1A, process 100 may include requesting the content using the first tokenized content identifier (as shown by reference number 140). For example, user device 105 may provide, to content switch device 110, a first request for content referenced by the first tokenized content identifier.

As further shown in FIG. 1A, process 100 may include identifying the content identifier based on the first tokenized content identifier (as shown by reference number 142). For example, content switch device 110 may determine that the first tokenized content identifier is a tokenized content identifier (e.g., based on recognizing the "-cb" in the filename of the first tokenized content identifier), and may determine the content identifier. In other words, for "animal-cb12345.jpg," content switch device 110 may determine that "-cb" identifies a cache-busting token "12345," and, content switch device 110 may remove the token to determine that the content identifier is "animal.jpg." By extracting the content identifier from the first tokenized content identifier, content switch device 110 may facilitate integration with user device 105 without user device 105 being configured to utilize the token. In another example, application server device 115 and/or content server device 120 may include a filter associated with identifying the content identifier based on the first tokenized content identifier.

As further shown in FIG. 1A, process 100 may include routing the first request for the content with the content identifier (as shown by reference number 144). For example, content switch device 110 may determine that the content identifier references first content associated with content server device 120, and may route a request for the content identified by the content identifier to content server device 120 (e.g., without the token). In this way, content switch device 110 facilitates integration with content server device 120 without content server device 120 being configured to utilize the token.

As further shown in FIG. 1A, process 100 may include providing the first content with the first modification information (as shown by reference number 146). For example, content server device 120 may provide the first content referenced by the content identifier to user device 105 as a response to the request for the content identified by the first tokenized content identifier (e.g., referenced by the content identifier). User device 105 may provide the content for the page based on receiving the content, such as by displaying "animal.jpg" via a user interface. Content server device 120 may provide the first modification information, such as a last modified date identifying when the content referenced by the content identifier was established as the first content. In other words, content server device 120 provides information identifying when "animal.jpg" was configured to refer to an image of a cat (rather than another image).

As further shown in FIG. 1A, process 100 may include caching the first content with the modification information (as shown by reference number 148). For example, user device 105 may cache the first content with the modification information. Based on user device 105 not receiving the content identifier (but rather the first tokenized content identifier), user device 105 may associate the content referenced by the content identifier (e.g., the first content) with the first tokenized content identifier. User device 105 may associate the first content with the first modification information to facilitate periodic removal of information from the cache, as described herein.

As further shown in FIG. 1A, process 100 may include periodically removing information from the cache based on modification information (as shown by reference number 150). For example, user device 105 may remove cached content from the cache when user device 105 determines that an element of content has been stored in the cache for a threshold period of time. In another example, user device 105 may remove cached content from the cache when user device 105 determines that the modification information indicates that an age of the content satisfies a threshold. Assume that user device 105 does not remove the first content from the cache.

As shown in FIG. 1B, process 100 may include requesting the page (as shown by reference number 152). For example, user device 105 may transmit a second request for the page (e.g., a user may refresh a website represented by the page, the user may navigate to the website represented by the page, the user may request another instance of the page, etc.), as described herein with regard to reference number 130.

As further shown in FIG. 1B, process 100 may include routing the second request for the page (as shown by reference number 154). For example, content switch device 110 may route the second request for the page to application server device 115, as described herein with regard to reference number 132.

As further shown in FIG. 1B, process 100 may include generating the first tokenized content identifier based on the content identifier in the page and the first modification information (as shown by reference number 156). For example, assuming that the content identifier and the first modification information (e.g., the last modified date) remains unchanged, application server device 115 may generate the same first token based on the content identifier and the modification information and the same first tokenized content identifier based on the first token, as was described herein with regard to reference number 134. In another example, application server device 115 may store information identifying the first token and/or the first tokenized content identifier, and may periodically remove the first token and/or the first tokenized content identifier from a data structure and generate another token and/or another tokenized content identifier based on determining that the modification information has changed.

As further shown in FIG. 1B, process 100 may include providing the page with the first tokenized content identifier (as shown by reference number 158). For example, application server device 115 may provide the first tokenized content identifier in the program code of the page, as described herein with regard to reference number 136.

As further shown in FIG. 1B, process 100 may include determining that the first tokenized identifier is in the cache (as shown by reference number 160). For example, user device 105 may determine that the first tokenized content identifier received from application server device 115, as was described herein with regard to reference number 156, corresponds to the first tokenized content identifier that is stored in the cache, as was described herein with regard to reference number 148. In this case, user device 105 may obtain the content referenced by the first tokenized content identifier from the cache and without requesting the first content be provided by content server device 120. In this way, user device 105 utilizes the cache to reduce network resource usage relative to having to request and obtain the content via a network.

As further shown in FIG. 1B, process 100 may include replacing the first content with second content (as shown by reference number 162). For example, content server device 120 may alter the first image referenced by the content identifier to a second image that is referenced by the content identifier. In other words, if "animal.jpg" referenced a picture of a cat, content server device 120 may cause "animal.jpg" to reference a picture of a dog. In this way, content server device 120 may facilitate alteration of content of a page without requiring the code of the page to be altered.

As further shown in FIG. 1B, process 100 may include providing second modification information (as shown by reference number 164). For example, content server device 120 may provide second modification information to application server device 115 (e.g., an updated last modified date) based on replacing the first content with second content. In another example, application server device 115 may periodically query content server device 120 to obtain updated modification information.

As further shown in FIG. 1B, process 100 may include requesting the page (as shown by reference number 166). For example, user device 105 may transmit a third request for the page to content switch device 110, as described herein with regard to reference numbers 130 and 152.

As further shown in FIG. 1B, process 100 may include routing the third request for the page (as shown by reference number 168). For example, content switch device 110 may route the third request for the page to application server device 115, as described herein with regard to reference numbers 132 and 154.

As further shown in FIG. 1B, process 100 may include generating a second tokenized content identifier based on the content identifier in the page and the second modification information (as shown by reference number 170). For example, application server device 115 may generate a second token based on a hash of the content identifier and the second modification information, as described herein with regard to reference numbers 134 and 156. In this case, based on the second modification information being different from the first modification information, application server device 115 may generate a second token (e.g., "78910") which differs from the first token (e.g., "12345"), and may generate the second tokenized content identifier (e.g., "animal-cb78910.jpg") based on the second token.

In another example, application server device 115 may generate the second token and/or the second tokenized content identifier based on receiving the second modification information, and may store the second token and/or the second tokenized content identifier in a data structure. In this case, application server device 115 may obtain the second token and/or the second tokenized content identifier from the data structure based on receiving the request for the page.

As further shown in FIG. 1B, process 100 may include providing the page with the second tokenized content identifier (as shown by reference number 172). For example, application server device 115 may provide the page with the second tokenized content identifier to user device 105, as described herein with regards to reference numbers 136 and 158.

As further shown in FIG. 1B, process 100 may include determining that the second tokenized content identifier is not in the cache (as shown by reference number 174). For example, user device 105 may determine that the second tokenized content identifier is not stored in the cache (e.g., the cache includes the first tokenized content identifier, which differs from the second tokenized content identifier), as described herein with regard to reference number 138. In this way, based on user device 105 not locating the second tokenized content identifier in the cache, user device 105 is caused to request the second content for the page (rather than using the cached first content which is no longer intended for inclusion in the page), thereby facilitating cache-busting.

As further shown in FIG. 1B, process 100 may include requesting the content using the second tokenized content identifier (as shown by reference number 176). For example, user device 105 may provide a second request for content using the second tokenized content identifier, as described herein with regard to reference number 140.

As further shown in FIG. 1B, process 100 may include identifying the content identifier based on the second tokenized content identifier (as shown by reference number 178). For example, content switch device 110 may determine that the second tokenized content identifier (e.g., "animal-cb78910.jpg") included in the second request for content is a tokenized content identifier. In this case, content switch device 110 may identify the content identifier (e.g., "animal.jpg") included in the second tokenized content identifier, as described herein with regard to reference number 142.

As further shown in FIG. 1B, process 100 may include routing the second request for content with the content identifier (as shown by reference number 180). For example, content switch device 110 may route the second request for content with the content identifier to content server device 120, as described herein with regard to reference number 144.

As further shown in FIG. 1B, process 100 may include providing the second content with the second modification information (as shown by reference number 182). For example, content server device 120 may provide, to user device 105, the second content with the second modification information to fulfill the second request for content, as described herein with regard to reference number 146.

As further shown in FIG. 1B, process 100 may include caching the second content with the second modification information (as shown by reference number 184). For example, user device 105 may cache the second content (e.g., identified by the second tokenized content identifier) with the second modification information, as described herein with regard to reference number 148. User device 105 may provide the second content in the page, via a user interface, based on receiving the second content. For example, user device 105 may cause the image (e.g., the dog image) to be displayed within the page.

FIGS. 1A and 1B show example operations of process 100, in some implementations, process 100 may include additional operations, fewer operations, different operations, or differently arranged operations than those depicted in FIGS. 1A and 1B. Additionally, or alternatively, two or more operations of process 100 may be performed in parallel.

Figure 2:
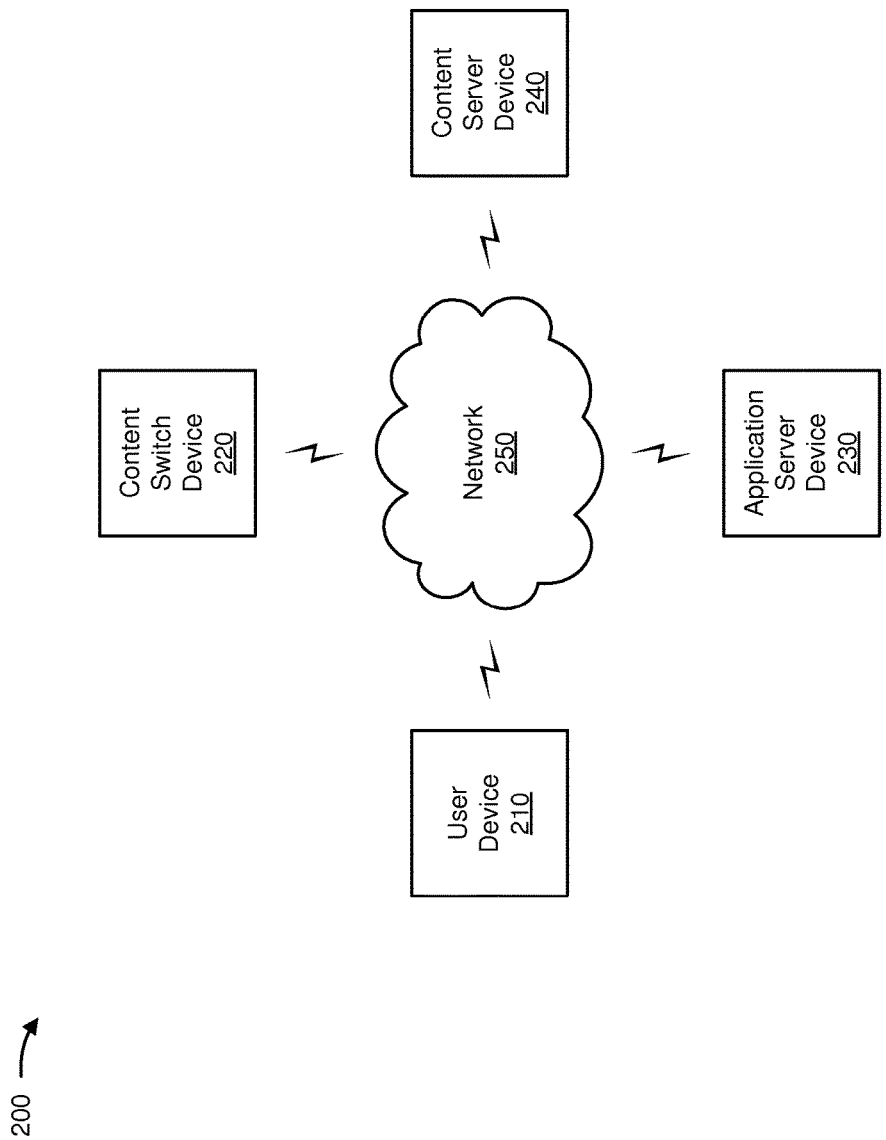
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a content switch device 220, an application server device 230, a content server device 240, and a network 250. Devices of environment 200 may interconnect via wired connections, wireless connections, or a combination of wired and wireless connections.

User device 210 may include one or more devices capable of receiving, generating, storing, processing, and/or providing information associated with content of a page. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may correspond to user device 105 shown in FIGS. 1A and 1B. In some implementations, user device 210 may include a cache for storing content associated with a page. In some implementations, user device 210 may receive information from and/or transmit information to another device in environment 200.

Content switch device 220 may include one or more devices capable of receiving, generating, storing, processing, and/or providing information associated with obtaining content associated with a page. For example, content switch device 220 may include a traffic transfer device, such as a gateway, a router, a modem, a switch, a firewall, a network interface card (NIC), a hub, a bridge, a server device, or any other type of device that processes and/or transfers traffic. In some implementations, content switch device 220 may correspond to content switch device 110 shown in FIGS. 1A and 1B. In some implementations, content switch device 220 may identify a token included in a content identifier. In some implementations, content switch device 220 may receive information from and/or transmit information to another device in environment 200.

Application server device 230 may include one or more devices capable of receiving, generating, storing, processing, and/or providing information associated with obtaining content associated with a page. For example, application server device 230 may include a server device that generates a token for a content identifier and modifies the content identifier to include the token. In some implementations, application server device 230 may correspond to application server device 115 shown in FIGS. 1A and 1B. In some implementations, application server device 230 may generate a hash based on a content identifier (e.g., a file name) and modification information (e.g., a last modified date). In some implementations, content switch device 220 may receive information from and/or transmit information to another device in environment 200.

Content server device 240 may include any type or form of content provider. For example, content server device 240 may include a website host (e.g., a provider of one or more websites). In some implementations, content server device 240 may include a repository of content for inclusion in one or more pages. For example, content server device 240 may store and/or provide an image, an audio file, a video file, a script, an advertisement, or the like. In some implementations, content server device 240 may correspond to content server device 120 shown in FIGS. 1A and 1B. In some implementations, content server device 240 may receive information from and/or transmit information to another device in environment 200.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, although content switch device 220 and application server device 230 are shown as two separate devices, content switch device 220 and application server device 230 may be implemented within a single device. Additionally, or alternatively, a set of devices (e.g., one or more devices) of environment 200 may perform one or more functions described as being performed by another set of devices of environment 200.

Figure 3:
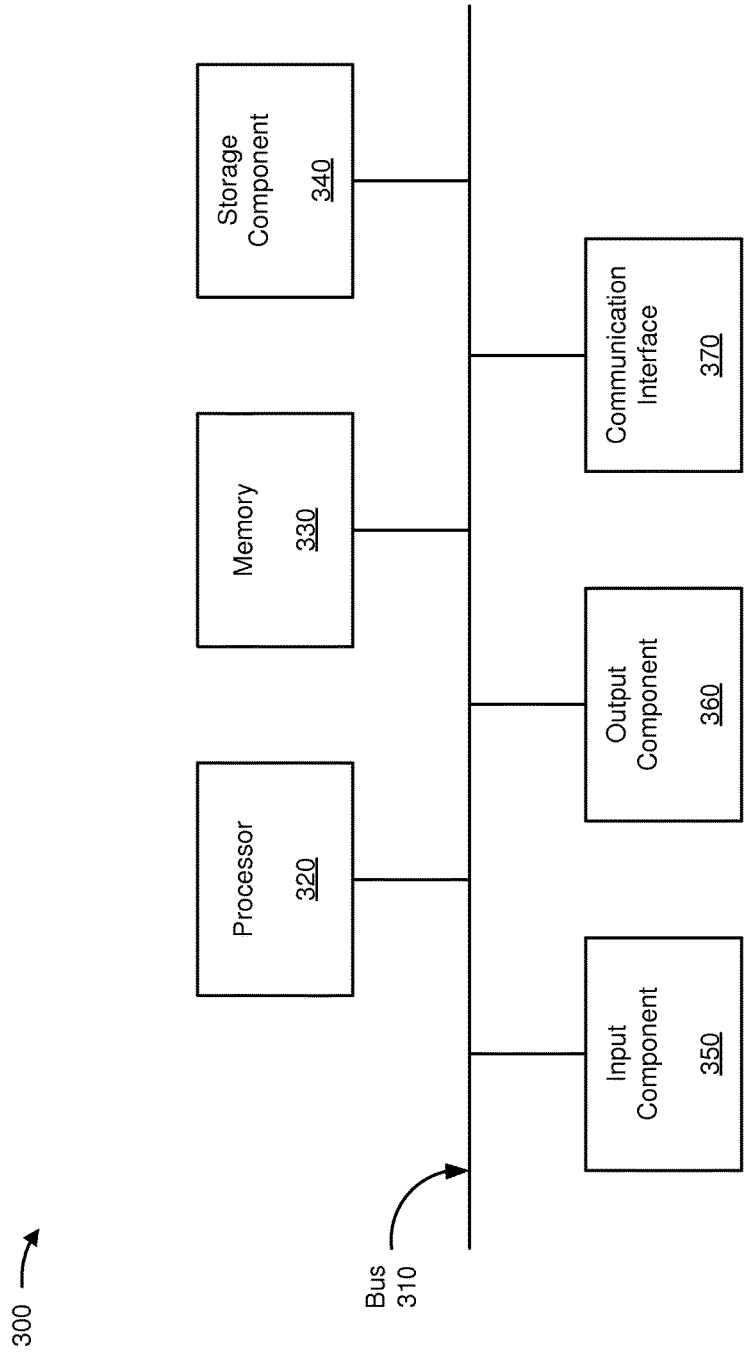
FIG. 3 is a diagram of example components of one or more devices of FIG. 2.

FIG. 3 is a diagram of example components of a device 300. Device 300 may correspond to user device 210, content switch device 220, application server device 230, and/or content server device 240. In some implementations, user device 210, content switch device 220, application server device 230, and/or content server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
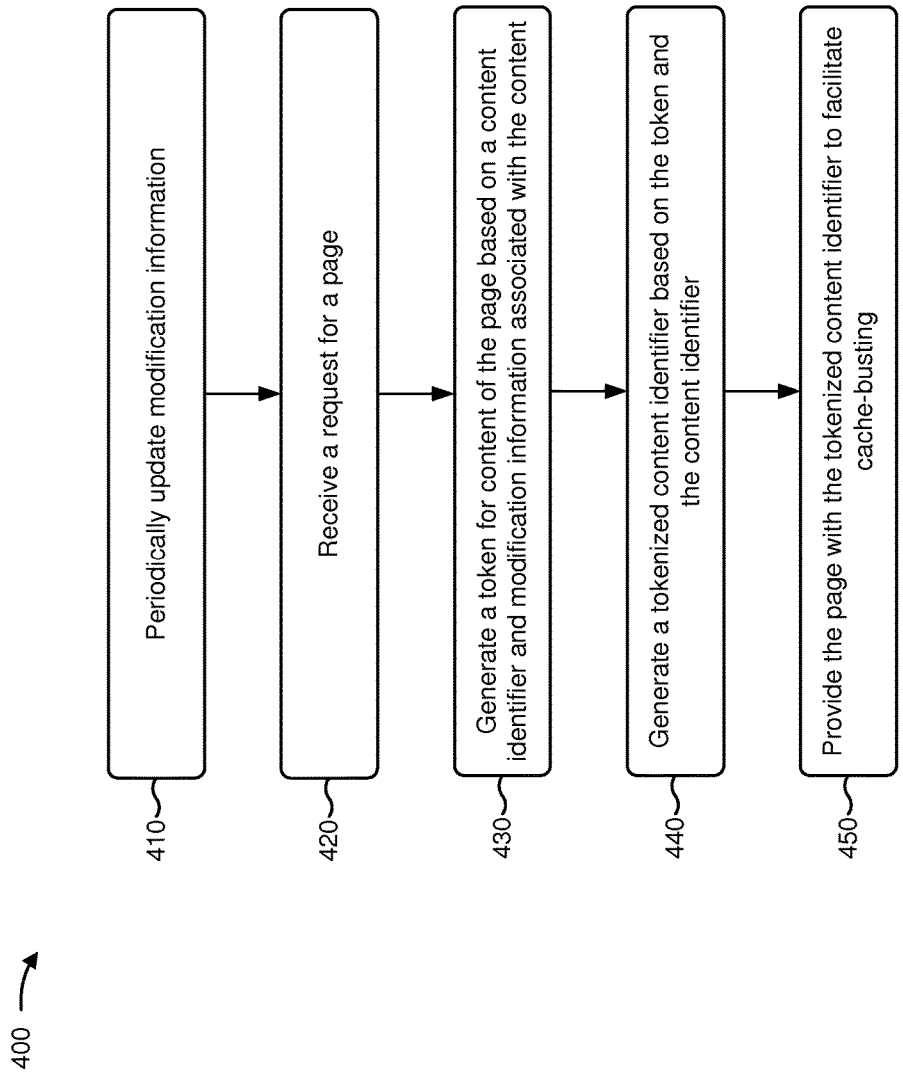
FIG. 4 is a flow chart of an example process for generating a token to facilitate dynamic cache-busting.

FIG. 4 is a flow chart of an example process 400 for generating a token to facilitate dynamic cache-busting. In some implementations, one or more process blocks of FIG. 4 may be performed by application server device 230. In some implementations, one or more process blocks of FIG. 4 may be performed by another device or a group of devices separate from or including application server device 230, such as user device 210, content switch device 220, and content server device 240.

As shown in FIG. 4, process 400 may include periodically updating modification information (block 410). For example, application server device 230 may periodically update modification information associated with content. In some implementations, application server device 230 may receive updated modification information associated with an element of content (e.g., an image) when the element of content is updated. For example, when content server device 240 updates the content (e.g., content server device 240 receives a first element of content to replace a second element of content identified by the same content identifier), content server device 240 may provide updated modification information to application server device 230. Additionally, or alternatively, application server device 230 may obtain updated modification information. For example, based on a threshold period of time being satisfied (e.g., 1 hour, 10 hours, 10 days, etc.), application server device 230 may request updated modification information for the content obtainable from content server device 240. In this way, based on updating modification information asynchronously with generating tokens based on modification information, application server device 230 reduces system resource usage, network usage, or the like relative to updating modification information when a token is to be generated.

As further shown in FIG. 4, process 400 may include receiving a request for a page (block 420). For example, application server device 230 may receive the request for the page. In some implementations, application server device 230 may receive the request for the page from user device 210 (e.g., via content switch device 220). For example, user device 210 may request HTML code associated with a JSP page. Additionally, or alternatively, application server device 230 may receive the request for the page from user device 210 without routing being performed by content switch device 220.

As further shown in FIG. 4, process 400 may include generating a token for content of the page based on a content identifier and modification information associated with the content (block 430). For example, application server device 230 may generate the token for the content based on the modification information. In some implementations, application server device 230 may utilize a hash algorithm to generate the token (e.g., an MD5 hash algorithm). For example, application server device 230 may hash a string representing a content identifier of content in the HMTL code associated with the JSP page and a string representing a last modified date for content referenced by the content identifier. Additionally, or alternatively, application server device 230 may generate the token based on an algorithm other than a hash algorithm. In this way, application server device 230 may ensure that on a server restart, new tokens will not be generated for content that remains unchanged, based on the hash algorithm having a single output corresponding to a provided input. Moreover, when application server device 230 receives updated modification information (e.g., a different last modified date) for a content identifier, application server device 230 may ensure that another token generated based on the updated modification information is different from the token generated using the modification information based on using a hash algorithm with a reduced probability of a hash collision relative to another technique for generating the token.

In some implementations, application server device 230 may identify a content identifier in the page for which the token is to be generated. For example, application server device 230 may determine that HTML code of the JSP page includes cache-busting code, and may determine to generate a token for a tokenized content identifier based on the content identifier. In this way, application server device 230 may perform cache-busting (e.g., generating the token to cause cache-busting) for content identifiers that a developer of the page intended and/or tested for cache-busting.

As further shown in FIG. 4, process 400 may include generating a tokenized content identifier based on the token and the content identifier (block 440). For example, application server device 230 may include the token in the content identifier of the content to generate a tokenized content identifier. In some implementations, application server device 230 may include an indicator of the token in the content identifier (e.g., a string that may be identified by content switch device 220, application server device 230, or the like to identify the tokenized content identifier as a tokenized content identifier). For example, application server device 230 may, for a content identifier (e.g., "animal.jpg"), include the content identifier (e.g., a first string, "animal"), an indicator of the token (e.g., a second string "-cb"), the token (e.g., a third string "12345"), and a file name extension as a suffix (e.g. ".jpg") to generate the tokenized content identifier (e.g., "animal-cb12345.jpg"). This is just one example of how a tokenized content identifier can be generated. Other ways of generating a tokenized content identifier are possible.

In some implementations, application server device 230 may replace program code representing the content identifier with the tokenized content identifier. For example, application server device 230 may remove the content identifier from a program code location in the HTML code of the JSP page, and may insert the tokenized content identifier at the program code location.

As further shown in FIG. 4, process 400 may include providing the page with the tokenized content identifier to facilitate cache-busting (block 450). For example, application server device 230 may provide the page with the tokenized content identifier to cause user device 210 to request the content using the tokenized content identifier and to cause content server device 240 to provide the content for storage in a cache of user device 210. Further to the example, content switch device 220 (or application server device 230 or the like) may receive a request, which includes the tokenized content identifier, for the content and may determine the content identifier from the tokenized content identifier (e.g., based on recognizing the indicator "-cb" in the tokenized content identifier). In this case, content switch device 220 may cause content server device 240 to provide the content to user device 210 without user device 210 having determined and stored the content identifier. Moreover, user device 210 may store the content in a cache in association with the tokenized content identifier (and the modification information for utilization in a subsequent removal of the content from the cache when the modification information satisfies an age threshold) rather than with the content identifier.

Further to the example, when the content remains unchanged (and the modification information remains unchanged), user device 210 will receive the same tokenized content identifier from application server device 230 based on requesting the page again, and may locate the content in the cache using the tokenized content identifier. Alternatively, when the content is changed to other content with the same content identifier but different modification information, user device 210 will receive another, different tokenized content identifier from application server device 230 based on requesting the page again, causing user device 210 to fail to locate the other tokenized content identifier in the cache. In this case, user device 210 may be caused to request the other content with the other tokenized content identifier, thereby causing user device 210 to receive the other content for display rather than the content (which is no longer intended to be displayed).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, application server device 230 may facilitate cache-busting for content of a page based on generating a tokenized content identifier to replace a content identifier. Moreover, application server device 230 may maintain developer code without making alterations that were unintended by the developer (e.g., application server device 230 may replace the content identifier with the tokenized content identifier when a developer has tagged the content identifier as being intended for cache-busting), thereby reducing a likelihood of errors, malicious alteration of code, or the like relative to altering the code in an unintended manner.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memory devices to store instructions; and
one or more processors to execute the instructions to:
receive a first request for a page,
the page including a content identifier that is associated with referencing first content for the page,
the content identifier being associated with cache-busting being performed;
determine first modification information associated with the first content based on receiving the first request for the page;
determine that the first modification information has not been altered relative to a prior instance of modification information;
generate a first token based on the content identifier and based on determining that the first modification information has not been altered relative to the prior instance of the modification information;
generate a first tokenized content identifier based on the first token and the content identifier,
the first tokenized content identifier being the same as a prior instance of a tokenized content identifier;
provide the first tokenized content identifier,
the first tokenized content identifier being associated with referencing the first content for the page,
the first tokenized content identifier being stored in a cache;
receive second modification information,
the second modification information indicating that the content identifier is associated with referencing second content that is different from the first content;
receive another request for the page after receiving the second modification information;
generate a second token based on the content identifier and the second modification information,
the second token being different from the first token;
generate a second tokenized content identifier based on the second token and the content identifier,
the second tokenized content identifier being different than the first tokenized content identifier;
provide the second tokenized content identifier,
the second tokenized content identifier being associated with referencing the second content for the page;
determine that a threshold period of time associated with updating the first modification information has been satisfied; and
selectively update the first modification information based on determining that the threshold period of time associated with updating the first modification information has been satisfied,
where selectively updating the first modification information is performed asynchronously with generating the first token based on the first modification information.

2. The device of claim 1, where the one or more processors, when generating the first token, are to:
generate the first token based on a hash of the content identifier and the first modification information.

3. The device of claim 1, where the one or more processors are further to:
provide the second tokenized content identifier to cause the second content to be provided for storage in the cache.

4. The device of claim 1, where the one or more processors are further to:
cause the first content to be obtained from the cache based on providing the first tokenized content identifier that corresponds to the prior instance of the tokenized content identifier.

5. The device of claim 4, where the one or more processors are further to:
cause the first content to be provided via the page based on causing the first content to be obtained from the cache.

6. The device of claim 1, where the one or more processors are further to:
cause the second content to be obtained from a content provider based on providing the second tokenized content identifier that does not correspond to the first tokenized content identifier.

7. The device of claim 1, where the one or more processors are further to:
cause the first content to be removed from the cache by a user device that includes the cache based on at least one of:
a period of time associated with the first content being stored in the cache satisfying a threshold, or
the first modification information satisfying an age threshold.

8. A computer-readable medium storing instructions, the instructions comprising:
one or more instructions that, when executed by one or more processors, cause the one or more processors to:
receive a first request for a page,
the page including a content identifier that is associated with referencing first content for the page,
the content identifier being associated with cache-busting being performed;
determine first modification information associated with the first content based on receiving the first request for the page, determine that the first modification information has been altered relative to a prior instance of modification information;
generate a first token based on the content identifier and based on determining that the first modification information has not been altered relative to the prior instance of the modification information;
generate a first tokenized content identifier based on the first token and the content identifier,
the first tokenized content identifier being the same as a prior instance of a tokenized content identifier;
provide the first tokenized content identifier,
the first tokenized content identifier being associated with referencing the first content for the page,
the first tokenized content identifier being stored in a cache;
receive second modification information,
the second modification information indicating that the content identifier is associated with referencing second content that is different from the first content;
receive another request for the page after receiving the second modification information;
generate a second token based on the content identifier and the second modification information,
the second token being different from the first token; and
generate a second tokenized content identifier based on the second token and the content identifier,
the second tokenized content identifier being different than the first tokenized content identifier;
provide the second tokenized content identifier,
the second tokenized content identifier being associated with referencing the second content for the page;
determine that a threshold period of time associated with updating the first modification information has been satisfied; and
selectively update the first modification information based on determining that the threshold period of time associated with updating the first modification information has been satisfied,
where selectively updating the first modification information is performed asynchronously with generating the first token based on the first modification information.

9. The computer-readable medium of claim 8, where the one or more instructions, that cause the one or more processors to generate the first token, further cause the one or more processors to:
generate the first token based on a hash of the content identifier and the first modification information.

10. The computer-readable medium of claim 8, where the one or more instructions, that cause the one or more processors to provide the second tokenized content identifier, cause the one or more processors to:
provide the second tokenized content identifier to cause the second content to be provided for storage in the cache.

11. The computer-readable medium of claim 8, where the one or more instructions, that cause the one or more processors to provide the second tokenized content identifier, cause the one or more processors to:
provide the second tokenized content identifier to cause the second content to be provided for the page with the second modification information for the second content,
the second modification information being provided to facilitate a subsequent removal of the first content from the cache.

12. The computer-readable medium of claim 8, where the one or more instructions, when executed by the one or more processors, further cause the one or more processors to:
cause the first content to be obtained from the cache based on providing the first tokenized content identifier that corresponds to the prior instance of the tokenized content identifier.

13. The computer-readable medium of claim 12, where the one or more instructions, when executed by the one or more processors, further cause the one or more processors to:
cause the first content to be provided via the page based on causing the first content to be obtained from the cache.

14. The computer-readable medium of claim 8, where the one or more instructions, when executed by the one or more processors, further cause the one or more processors to:
cause the second content to be obtained from a content provider based on providing the second tokenized content identifier that does not correspond to the first tokenized content identifier.

15. A method, comprising:
receiving, by a device, a first request for a page,
the page including a content identifier that is associated with referencing first content for the page,
the content identifier being associated with cache-busting being performed;
determining, by the device, first modification information associated with the first content based on receiving the first request for the page;
determining, by the device, that the first modification information has not been altered relative to a prior instance of modification information;
generating, by the device, a first token based on the content identifier and based on determining that the first modification information has not been altered relative to the prior instance of the modification information;
generating, by the device, a first tokenized content identifier based on the first token and the content identifier;
providing, by the device, the first tokenized content identifier,
the first tokenized content identifier being associated with referencing the first content for the page,
the first tokenized content identifier being stored in a cache;
receiving, by the device, second modification information,
the second modification information indicating that the content identifier is associated with referencing second content that is different from the first content;
receiving, by the device, another request for the page after receiving the second modification information;
generating, by the device, a second token based on the content identifier and the second modification information,
the second token being different from the first token;
generating, by the device, a second tokenized content identifier based on the second token and the content identifier, the second tokenized content identifier being different than the first tokenized content identifier;

providing, by the device, the second tokenized content identifier,
 the second tokenized content identifier being associated with referencing the second content for the page;

determining, by the device, that a threshold period of time associated with updating the first modification information has been satisfied; and selectively updating, by the device, the first modification information based on determining that the threshold period of time associated with updating the first modification information has been satisfied,
 where selectively updating the first modification information is performed asynchronously with generating the first token based on the first modification information.

16. The method of claim 15, further comprising:

causing the first content to be removed from the cache by a user device that includes the cache based on at least one of:
 a period of time associated with the first content being stored in the cache satisfying a threshold, or
 the first modification information satisfying an age threshold.

17. The method of claim 15, where generating the first token comprises:

generating the first token based on a hash of the content identifier and the first modification information.

18. The method of claim 15, further comprising:

providing the second tokenized content identifier to cause the second content to be provided for storage in the cache.

19. The method of claim 15, further comprising:

causing the first content to be obtained from the cache based on providing the first tokenized content identifier that corresponds to a prior instance of a tokenized content identifier.

20. The method of claim 19, further comprising:

causing the first content to be provided via the page based on causing the first content to be obtained from the cache.

* * * * *